United States Patent Office 3,636,098
Patented Jan. 18, 1972

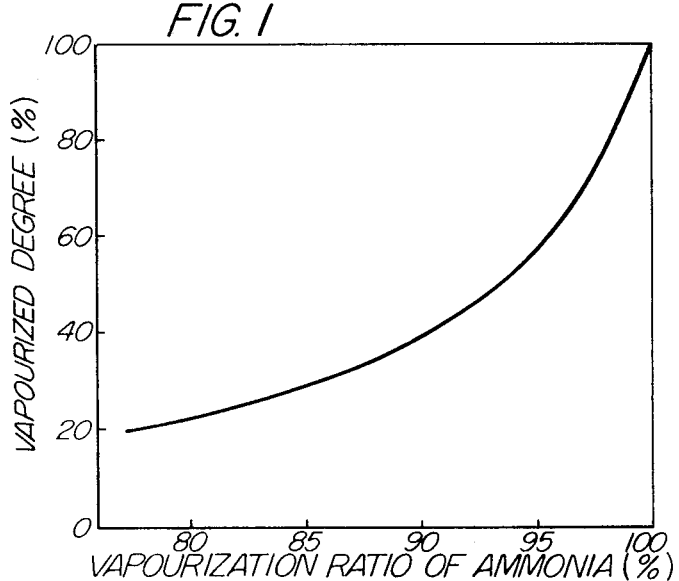
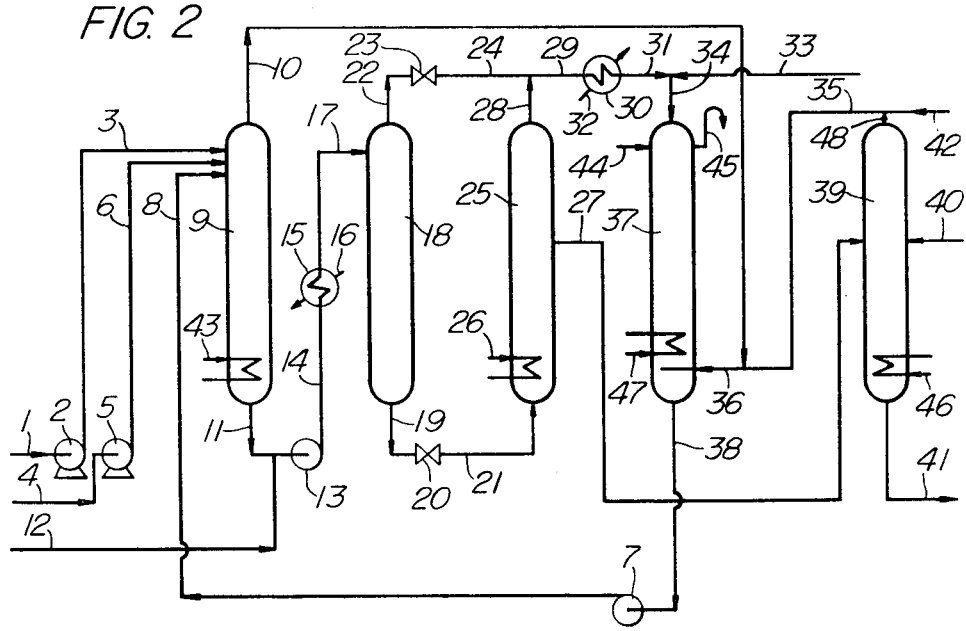

3,636,098
PROCESS FOR PRODUCING METHIONINE
Takesaburo Shima, Akio Yamagishi, Masao Sada, Bonji Osaki, and Zenichi Yamamoto, Niihama-shi, Japan, assignors to Sumitomo Chemical Company, Ltd., Osaka, Japan
Filed June 29, 1967, Ser. No. 650,016
Claims priority, application Japan, July 2, 1966,
41/43,158
Int. Cl. C07c *101/04, 149/20*
U.S. Cl. 260—534 S  5 Claims

ABSTRACT OF THE DISCLOSURE

A process for producing α-amino acid comprising introducing a synthesis liquid of a hydantoin compound directly into a hydrolysis step to effect the hydrolysis of said compound and then concentrating the resulting reaction liquid as well as recovering ammonia and carbon dioxide to recycle them to the synthesis step of the hydantoin compound. According to this process, not only α-amino acid can be continuously produced in high yields but also the reaction liquid can be concentrated without accompanying the degeneration and polymerization of α-amino acid and, moreover, ammonia and carbon dioxide can be recovered in large amounts and can be re-used.

---

This invention relates to an improved process for producing α-amino acid through a hydantoin compound in which not only α-amino acid can be produced in high yields but also such gas components as ammonia and carbon dioxide can be separated and recovered in large amounts from the production steps. The invention is further concerned with a process in which the recovered ammonia and carbon dioxide are reused as starting materials for the synthesis of hydantoin compound.

As one of the processes for the preparation of α-amino acid, there has heretofore been known a method in which the α-amino acid is obtained via a hydantoin compound. The above method is carried out, in general, by reacting (a) an aldehyde or ketone, (b) ammonia and carbon dioxide (ammonium carbonate or bicarbonate may be used in place thereof) and (c) hydrocyanic acid or a cyanide compound, to yield a hydantoin compound, then hydrolyzing the hydantoin compound in the presence of an alkali to form an alkali salt of α-amino acid, and neutralizing the alkali salt to obtain the objective α-amino acid. The above reaction may be represented, for example, by the following equation:

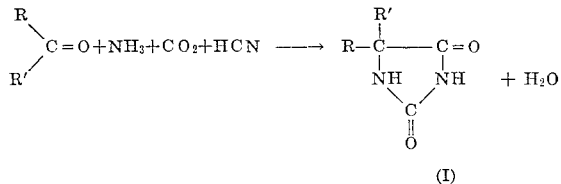

(Hydantoin compound synthesis step)

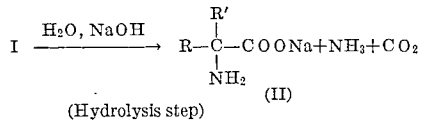

(Hydrolysis step)

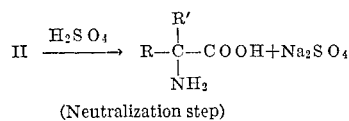

(Neutralization step)

wherein R and R' are individually a hydrogen atom, hydrocarbon radical or different atom-containing hydrocarbon radical.

In the synthesis step of the hydantoin compound, ammonia, carbon dioxide and hydrocyanic acid or a cyanide compound are used in excess amounts in order to make higher the conversion of aldehyde or ketone. That is, there are ordinarily employed, per mole of aldehyde or ketone, 2–6 moles of ammonia, 1.5–6 moles of carbon dioxide and 1.05–2 moles of hydrocyanic acid or a cyanide compound. Therefore, these excess starting components are required to be separated and recovered. Further, ammonia and carbon dioxide, which take part in the synthesis reaction of hydantoin compound, are required merely for the synthesis of the hydantoin compound, which is an intermediary product, and hence are necessarily discharged in the hydrolysis step of said compound.

In the conventional step for the synthesis of α-amino acid, there has ordinarily been adopted such a process that after the synthesis of hydantoin compound, the synthesis liquid is concentrated to isolate said hyantoin compound. The present inventors have observed that in the gas separated in the above case, only carbon dioxide is substantially contained, besides the vapor of reaction medium, and more valuable ammonia is scarcely contained. This is considered due to the fact that the hydantoin compound is so strong in acidity that ammonia is difficultly separated from the synthesis liquid. Moreover, in order to isolate the hydantoin compound, an acid is added to the synthesis liquid. The ammonia in said synthesis liquid reacts with the added acid to form a salt and cannot be recovered as ammonia. On the other hand, in order that ammonia is not fixed as a salt, it is necessary to add no acid. However, the present inventors have observed that in the above case the recovery yield of the hydantoin compound is greatly lowered. In the process of isolating hydantoin compound, there occurs such difficulty that not only ammonia cannot be recovered as mentioned above but the yield of α-amino acid is low.

Further, there has been proposed a process in which carbon dioxide and ammonia are intended to be removed as much as possible from the hydrolysis reaction step of hydantoin compound (Japanese patent publication No. 10,211/65). This process gives such advantage that the amount of alkali employed can be made smaller. According to the experiments of the present inventors, however, it has been found that in case ammonia and carbon dioxide are intended to be removed in large amounts, the reaction medium is distilled out of the system together with said gases and the reaction liquid is concentrated, with the result that the hydrolysis reaction yield is substantially lessened. For example, in preparing DL-methionine by the hydrolysis of 5-β-methylmercaptoethylhydantoin at 160° C. and 7 kg./cm.² in the presence of 2 moles per mole of said hydantoin of caustic soda using 2.1 l. of water as a reaction medium, the hydrolysis reaction yield is 97% based on said hydantoin when the reaction liquid has not been concentrated, while the reaction yield drops to 89% when the reaction liquid has been concentrated during the reaction to 1.5 l. Such a lowering of reaction yield is considered due to the fact that α-amino acid is polymerized. In case, therefore, the above process is adopted, it is necessary to remove only ammonia and carbon dioxide so that the reaction liquid is not concentrated by vaporization. However, for the removal of only ammonia and carbon dioxide, an additional means such as a rectifier or the like is required to make the operations troublesome. Further, in separating large amounts of gases from the hydrolysis step, there is also brought about a disadvantage in the point of corrosion. That is, the present inventors have observed that the liquid phase in the hydrolysis step is not so corrosive but the gas phase separated is markedly corrosive since the hydrolysis is ordinarily effected under relatively severe conditions. On the other hand, if the separation of the carbon dioxide and ammonia gas components has not been sufficient, said components are left in the liquid to be subjected to the neutralization step. Of these gas components, ammonia not only consumes a large amount of acid in the neutralization step but also forms an ammonium salt to lower the separation yield and purity of α-amino acid.

In the synthesis step of α-amino acid, various difficulties are encountered as mentioned above. In addition thereto, in concentrating a synthesis liquid of α-amino acid in order to crystallize α-amino acid, there is the further problem that the α-amino acid is degenerated or polymerized to be lowered in yield. Therefore, in concentrating said synthesis liquid also, it is necessary to take steps to avoid this problem.

As the result of examination to overcome the above difficulties, the present inventors have found that when the synthesis liquid of hydantoin is subjected to hydrolysis treatment without isolating the hydantoin compound, and is concentrated before a neutralization step and simultaneously effecting in said concentration step the separation of the gas components, no only the above drawbacks can be overcome to recover large amounts of the starting gas components, and the lowering of yield and the corrosion in the hydrolysis reaction can be prevented, but also α-amino acid can be synthesized in high yields, the amount of acid to be used in the neutralization step can be made smaller and the α-amino acid can be separated in high yields without accompanying degeneration and polymerization thereof.

For example in the synthesis of methionine, the yield based on acrolein increases by 10–20% in average as compared with the case where the hydantoin compound has been isolated.

Further, hydrocyanic acid has such a drawback that it tends to form a polymer in the presence of free ammonia. Therefore, in case hydrocyanic acid is incorporated in a separated gas containing ammonia, not only the utilization of said separated gas becomes difficult but also various injuries are brought about in the handling thereof. However, the present inventors have found that despite the fact that hydrocyanic acid or cyanide compound (this reacts with carbon dioxide under hydantoin compound synthesis conditions to form hydrocyanic acid) is used in excess and, moreover, the synthesis liquid of hydantoin compound is introduced directly into the hydrolysis step, no incorporation of hydrocyanic acid is observed in the gas separated in the above manner. Accordingly, the present inventors have discovered that the separated gas components can be recycled, without any injury, to the synthesis step of hydantoin compound.

An object of the present invention is to provide a process for producing α-amino acid in which ammonia and carbon dioxide used are separated and recovered in large amounts and, at the same time α-amino acid is produced and isolated in high yield.

Another object of the invention is to provide a process for producing α-amino acid in which ammonia and carbon dioxide gas components used are separated and recovered in large amounts and are recycled to the hydantoin synthesis step, thereby reducing the production costs of α-amino acid.

In order to accomplish these objects the present invention provides a process for producing α-amino acid which comprises reacting in an aqueous medium (a) an aldehyde or ketone, (b) ammonia and carbon dioxide, ammonium carbonate or ammonium bicarbonate and (c) hydrocyanic acid or a cyanide compound, wherein the components (b) and (c) being used in excess of the theoretical amounts based on the component (a), to yield a hydantoin compound, introducing the synthesis liquid of said compound directly into a hydrolysis step, without isolation of said hydantoin compound, to hydrolyze the hydantoin compound in the presence of an alkali, concentrating the resulting liquid simultaneously separating ammonia and carbon dioxide from said liquid, and isolating α-amino acid from the concentrated liquid either after neutralization of the alkali present in the concentrated liquid or after removal of said alkali by means of an ion exchange resin.

The gas components obtained from the above-mentioned concentration step may be recycled to the hydantoin compound synthesis step, either independently or together with the gas components separated from a least one of the other steps, i.e. the hydantoin compound synthesis step, hydrolysis step and neutralization step.

In accordance with the present invention, the hydantoin compound may be synthesized in the following manner: An aldehyde or ketone, an ammonia component, a carbon dioxide component and a hydrocyanic acid component are reacted in an aqueous medium at about atmospheric pressure and a temperature ranging from room temperature to 100° C. In this case, the reaction may also be effected under more or less superatmospheric pressure or under reduced pressure. As the reaction medium, water is ordinarily used, but an organic medium such as alcohol or the like may also be employed together with water.

In case ammonia and carbon dioxide are used in combination, the molar ratio of ammonia to carbon dioxide is preferably 1–2:1, and the molar ratios of ammonia and carbon dioxide to aldehyde or ketone are preferably 2–12:1 and 1.5–6:1, respectively. Further, in the case of ammonium bicarbonate or carbonate, it is preferable that the molar ratio of ammonium bicarbonate to aldehyde or ketone be 2–6:1 and that of ammonium carbonate to aldehyde or ketone be 1.5–6:1.

As the hydrocyanic acid component, a cyanide compound such as sodium or potassium cyanide may also be used besides hydrocyanic acid. These are preferably used in an amount of 1.05–2 moles per mole of aldehyde or ketone.

As the aldehydes and ketones to be used in the present invention, there may be exemplified formaldehyde, acetaldehyde, isobutylaldehyde, D-α-methylbutylaldehyde, β-methylmercatopropionaldehyde, β-ethoxycarbonylpropionaldehyde, furfural, acetone, methylethylketone, methylisopropylketone, methylbenzylketone and cyclohexanone. From these hydantoin, 5-methylhydantoin, 5-isopropylhydantoin, 5-α-methylpropylhydantoin, 5-β-methylmercaptoethylhydantoin, 5-β-ethoxycarbonylethylhydantoin, 5-furylhydantoin, 5,5-dimethylhydantoin, 5-methyl-5-ethylhydantoin, 5-methyl-5-isopropylhydantoin, 5 - methyl - 5-benzylhydantoin and 5,5-cyclopentylenehydantoin are synthesized, respectively.

Synthesis liquids containing these hydantoin compounds are subjected to hydrolysis treatment using alkali, without isolation of the hydantoin compounds, whereby, alkali salts of α-amino acid are formed. According to such procedure, the synthesis steps of α-amino acid can be made continuous and the yield thereof greatly increases.

The amount of the reaction medium employed in the hydrolysis is preferably 1.5–5 l. per mole of hydantoin compound which is present at the beginning of the hydrolysis. In case the amount of the reaction medium is smaller than said range, side reactions tend to occur to lower the hydrolysis reaction yield. In case the amount of the reaction medium is greater than said range, the reaction rate becomes low and operational disadvantages are brought about. In the hydrolysis step, the reaction medium is ordinarily used in an amount larger than in the hydantoin compound synthesis step. Therefore, it is not desirable to concentrate the synthesis liquid of hydantoin compound.

From the hydrolysis step, a part of gas may be withdrawn. In this case, however, the amount of the separated gas should be suppressed to such an extent that the amount of the reaction medium can be maintained within the above-mentioned range. As the alkali, there may be employed a hydroxide or carbonate of an alkali metal or alkaline earth metal. The amount of the alkali employed is desirably 1–4 moles per mole of hydantoin compound. The hydrolysis is preferably effected at a temperature of 100°–200° C. and a pressure of 1–16 atm.

In the present process, there is subsequently provided a concentration step, in which the hydrolysis liquid is concentrated and, at the same time, such gas components as ammonia and carbon dioxide are removed. By the provision of the concentration step, the separation of large amounts of the gas components can be easily effected. In this concentration step α-amino acid is stable and does not cause degeneration or polymerization. This is considered due to the fact that in the liquid obtained from the hydrolysis step, α-amino acid has converted into an alkali salt. For example, when an aqueous free methionine solution at pH 5.4 is concentrated at 100° C., about 0.5% per hour of methionine varies to a polymer. However, when the liquid from said hydrolysis step which has a pH of about 10 is concentrated in the same manner as above, no formation of polymer is observed at all. Thus, in the present process, the reaction liquid can be concentrated without accompanying the loss of α-amino acid and the α-amino acid can be isolated in high yields.

Further, by the said concentration step, a large amount of gas is not required to be separated from the hydrolysis step, with the result that the lowering of reaction yield and the corrosion of apparatus in the hydrolysis step can be prevented. Moreover, the gas components are substantially removed in said concentration step and ammonia which is left in the reaction liquid is in small amount. Therefore the amount of acid consumed in the neutralization step can be minimized and subsequently the amount of ammonium salt formed can be also minimized to lead to the better isolation yield of α-amino acid.

In the accompanying drawings, FIG. 1 shows the relationship between vaporized degree (the ratio of the weight of vaporized liquid to the weight of hydrolysis liquid fed to the concentration step) and vaporization ratio of ammonia (the ratio of the amount of ammonia in the vaporized liquid to that in the hydrolysis liquid). If the vaporized degree is low, the recovery ratio of ammonia is lowered, while if said degree is high, salts are deposited from the liquid after concentration. It is desirable that the liquid be concentrated to such an extent that the amount of the liquid becomes 30–80% by weight, preferably 40–70% by weight. In this case, 76–97% of ammonia is removed and, at the same time, carbon dioxide not combined with alkali is also separated. The concentration may be carried out either under reduced pressure, at atmospheric pressure or under more or less superatmospheric pressure. In the concentration step of the present invention, however, the stability of α-amino acid is so high that the concentration is not required to be effected under an excessively reduced pressure. That is, under a pressure of about 1.2 atm.—700 mm. Hg, the concentration can be carried out with operational advantages without accompanying the formation of by-products. The concentration temperature to be adopted in the above case is 95°–110° C.

Subsequently, the solution containing a salt of α-amino acid which has been obtained from the concentration step is neutralized to isoelectric point of α-amino acid by use of an acid such as sulfuric acid or the like. Alternatively, as a modification of the above neutralization, the solution may be dealkalized by means of an ion exchange resin.

The solution after neutralization is allowed to cool as such whereby α-amino acid can be crystallized. It is of course possible to subject the solution to further concentration prior to the deposition of α-amino acid. It is, however, rather desirable to adopt such procedures that in said concentration step, the concentration be effected to a degree more than that required, thereby separating the gas components as much as possible, and then water is added prior to deposition of α-amino acid so as to prevent the deposition of impurities together with the α-amino acid.

The second process of the present invention is such that the ammonia and carbon dioxide separated in the concentration step, as mentioned above, are recycled to the synthesis step of hydantoin compound in which they are used as starting materials. According to the studies of the present inventors, it has been found that hydrocyanic acid used in excess in the hydantoin compound synthesis step, or hydrocyanic acid formed under the reaction conditions from a cyanide used in excess, is quickly formed into a formate in the subsequent hydrolysis step. Accordingly, the separated gases have not been incorporated with hydrocyanic acid and hence can be easily recycled to the synthesis step. In the above case, if a part of a gas (composed mainly of carbon dioxide, ammonia and steam) is separated also from the hydrolysis step, the separated gas may be recycled as well, since no incorporation of hydrocyanic acid is either observed in said gas. Further, from the hydantoin compound synthesis step also, a gas consisting chiefly of carbon dioxide and steam may be separated, and the gas may also be recycled (although said gas is incorporated with ammonia and hydrocyanic acid, the amount of said ammonia is small and the hydrocyanic acid is stable). In addition, a gas composed mainly of carbon dioxide and steam is generated from the neutralization step. This gas may be recycled as well.

In this case, the gas components may be recycled as such to the hydantoin compound synthesis step without forming them into liquids. In such a recycle procedure, however, ammonia and carbon dioxide in the gas react each other, whereby solids are liable to be formed. In addition the temperature control in the hydantoin compound synthesis step becomes difficult because the reaction heat and dissolution heat of ammonia and carbon dioxide and, further, the condensation heat of the accompanying steam are generated to give detrimental effects to the hydantoin compound synthesis reaction, which is an exothermic reaction. In the present process, therefore, it is desirable to adopt such procedures that the gas and steam withdrawn from each of the above-mentioned steps are condensed and, if necessary, are absorbed in water under pressure or at atmospheric pressure to prepare an aqueous solution containing ammonia and carbon dioxide in a free or combined state, and the said aqueous solution is recycled to the hydantoin compound synthesis step.

Thus, in the present invention, carbon dioxide and ammonia are effectively separated and recovered and are recycled and therefore α-amino acid can be produced by supplementing them only in small amounts or without any substantial supplement thereof.

In accordance with the present process, the aforesaid hydantoin compounds are used to synthesize glycine, alanine, valine, isoleucine, methionine, glutamic acid, furylglycine, α-aminoisobutyric acid, α-amino-α-methylbutyric acid, α-amino-α,β-dimethylbutyric acid, α-methylphenylalanine and cyclopentyleneglycine.

An embodiment of the process for practicing the present invention will be illustrated below with reference to the case where methionine is produced.

In FIG. 2, β-methylmercaptopropionaldehyde is fed through line 1, pump 2 and line 3 to hydantoin synthesis reactor 9. Hydrocyanic acid, an aqueous hydrocyanic acid or cyanide solution is fed through line 4, pump 5 and line 6 to the reactor 9. A recycle aqueous solution of carbon dioxide and ammonia, ammonium carbonate or bicarbonate or a mixture thereof is cyclically fed from the bottom of absorption column 37 to the reactor 9 through line 38, pump 7 and line 8. In the reactor 9, the above starting materials are mixed, heated and reacted to synthesize 5-β-methylmercaptoethylhydantoin. The heating is effected by introducing steam through line 43. Gas and vapor generated during the reaction are injected through lines 10 and 36 into the absorption column 37. The 5-β-methylmercaptoethylhydantoin is withdrawn in the form of an aqueous solution from the reactor 9 through line 11, is mixed with an aqueous caustic alkali solution introduced through line 12, is pressurized by means of pump 13 and is fed through line 14, preheater 15 and line 17 to hydrolysis reactor 18. In the preheater 15, steam or other heating medium is introduced through line 16 to heat the solution. In the reactor 18, the 5-β-methylmercaptoethylhydantoin is converted into a methionine salt. During the above reaction, gas and vapor are partly taken out from the top of the reactor 18 and are withdrawn through line 22, pressure control valve 23 and line 24. The aqueous methionine salt solution formed is withdrawn through line 19, valve 20 and line 21 and is fed to concentration column 25. In the concentration column 25, the solution is heated by means of steam introduced through line 26, whereby steam, ammonia and carbon dioxide are vaporized. The gas and vapor to be withdrawn from the concentration column 25 are discharged through line 28 and are passed through line 29 to condenser 30 together with the vapor and gas from the line 24. In the condenser 30, the gas and vapor are cooled by means of cooling water introduced through line 32 to form an aqueous solution containing ammonium bicarbonate or carbonate, which is then fed through lines 31 and 34 to the absorption column 37. If necessary, a pump may be inserted in line 31 or 34. The reaction liquid concentrated in the concentration column 25 is withdrawn through line 27 and is passed to neutralization column 39. To the neutralization column 39, an acid is fed through line 40. This acid converts the methionine salt to free methionine as well as reacts with the carbonate present together to generate carbon dioxide. The thus generated carbon dioxide is introduced through lines 48, 35 and 36 into the absorption column 37. Heat generated in the neutralization column 39 is removed by introducing cooling water through line 46. The aqueous solution of methionine formed in the neutralization column 39 is withdrawn through line 41. In the absorption column 37, the liquid gas and vapor from the lines 34 and 36 are contacted each other to form an aqueous solution of ammonium bicarbonate or carbonate. The cooling inside the absorption column 37 is effected by introducing cooling water or cooling medium through line 47. If necessary, water may be supplemented through line 44, ammonia water or ammonia through line 33 and carbon dioxide through line 42. The gas which has not been absorbed in the absorption column is discharged through line 45 into air. The operation in the absorption column 37 may be effected under pressure. In such a case, the lines 34 and 36 may be provided with a pump and a compressor, respectively.

The above illustration shows an embodiment of the process for practicing the present invention, and the present process is not limited only to the above process. For example, in place of withdrawing the gases composed mainly of carbon dioxide from the reactor 9 and neutralization column 39 and recycling the same, a required amount of carbon dioxide may be supplied from an external source. Further, the lines 22 and 24 and the pressure control valve 23 may be omitted to effect no withdrawal of gas from the reactor 18.

The following example illustrates the present invention, but the invention is not limited only to the example. In the example, all the percentages are by weight unless otherwise described.

EXAMPLE 1

A small-sized continuous apparatus as shown in FIG. 2 was assembled and was operated under such conditions as shown below. From the line 1, 105 g. per hour of 99% purity β-methylmercaptopropionaldehyde was fed; from the line 4, 57 g. per hour of a 50% aqueous hydrocyanic acid solution; and from the line 8, 1794 g. of an aqueous solution containing 3.32% of ammonia and 6.87% of carbon dioxide. In the interior of the reactor 9, the reaction of the above compounds was effected with stirring at 80° C. and atmospheric pressure. The retention time of the reaction liquid was 1.5 hours. The resulting aqueous solution containing 5-β-methylmercaptoethylhydantoin was charged with 500 g. per hour of a 16% aqueous caustic soda solution. After preheating to 180° C., the mixed solution was reacted in the reactor 18 under a pressure of 10 kg./cm.$^2$ for a retention time of one hour. The resulting aqueous solution containing a sodium salt of methionine was heated in the concentration column 25 at 100° C. and atmospheric pressure to be concentrated to a vaporized degree of 40%, and was then sent to the neutralization column 39. In the neutralization column, the concentrated solution was neutralized at 90° C. by means of a 17.9% aqueous sulfuric acid solution. The resulting aqueous solution of methionine was obtained in an amount of 1568 g. per hour in which the amount of methionine was 8.75%. Thus, the yield was 92.1% based on the β-methylmercaptopropionaldehyde.

The amounts of individual components of the generated gases and vapors from the lines 10, 22, 28 and 35 in a stationary state under the above conditions were as shown in Table 1.

Table 1

| Line | (Unit: grams/hour) | | | |
|---|---|---|---|---|
| | 10 | 22 | 28 | 35 |
| Component: | | | | |
| Carbon dioxide | 48.4 | 33.4 | 20.5 | 20.9 |
| Ammonia | 1.7 | 34.6 | 21.0 | |
| Water | 19.3 | 183.1 | 812.9 | 17.4 |
| Total | 69.4 | 251.1 | 854.4 | 38.3 |

Of these gases and vapors, those from the lines 22 and 28 were cooled with water and the others were sent as such to the absorption column 37. Inside the absorption column, the gases and vapors were cooled to 10° C. by means of a brine at 0° C. Further, 23 g. per hour of 10% ammonia water was fed from the line 33 and 600 g. per hour of water from the line 44. Although the line 45 had been opened to air, no generation of gas was observed in a stationary state.

According to the above process, only ammonia may be externally supplied in such a small amount as 2.3 g. per hour, i.e. 0.135 times the mole of the β-methylmercaptopropionaldehyde. Thus, the present process is markedly economical as compared with the conventional method in which has been separately supplied, per mole of aldehyde, 1.5 moles of ammonium carbonate or 3 moles of ammonium bicarbonate.

The same results as above were obtained when sodium cyanide was used in equimolar amount in place of the hydrocyanic acid.

What is claimed is:

1. A continuous process for producing methionine, which comprises reacting at about atmospheric pressure and a temperature from room temperature to 100° C. in an aqueous medium (a) β-methylmercaptopropionaldehyde (b) ammonia and carbon dioxide, ammonium bicarbonate or ammonium carbonate and (c) hydrocyanic acid or a cyanide compound, to yield a hydantoin compound, hydrolyzing the hydantoin compound at a temperature of 100°–200° C. and a pressure of 1–16 atm. in the presence of an alkali in an amount of 1–4 moles per mole of hydantoin compound, concentrating the resulting liquid, isolating methionine from the concentrated liquid either after neutralization of the alkali present in the concentrated liquid or after removal of said alkali by means of an ion exchange resin characterized by introducing the hydantoin synthesis liquid containing said hydantoin compound directly into a hydrolysis zone, without isolation of said hydantoin compound, subjecting the hydrolyzing liquid after hydrolysis to concentration to about 30 to 80%, based on the initial weight, simultaneously separating ammonia and carbon dioxide from said liquid, and recycling to the hydantoin synthesizing step the ammonia and carbon dioxide separated in the concentrating step, the proportions of reactants being as follows: in the case of ammonia and carbon dioxide, the molar ratio of ammonia to carbon dioxide being 1–2:1, and the molar ratios of ammonia and carbon dioxide to β-methylmercaptopropionaldehyde being 2–12:1 and 1.5–6:1, respectively; in the case of ammonium bicarbonate or carbonate, the molar ratio of ammonium bicarbonate to β-methylmercaptopropionaldehyde is 2–6:1; in the case of ammonium carbonate the ratio to β-methylmercaptopropionaldehyde is 1.5:6–1; and the molar ratio of hydrocyanic acid or a cyanide compound to β-methylmercaptopropionaldehyde is 1.05–2:1.

2. A process according to claim 1, wherein the separated ammonia and carbon dioxide are recycled, to the step for synthesizing the hydantoin compound, together with gas components separated from at least one of the step for synthesizing the hydantoin compound, the step for hydrolyzing said compound and the step for neutralizing the alkali in the concentrated liquid.

3. A process according to claim 1, wherein ammonia and carbon dioxide are separated from the mixture during the hydrolyzing step and the thus-separated gases are also recycled to the reaction step.

4. A process according to claim 3, wherein unreacted ammonia and carbon dioxide separated from the reaction liquid are also recycled to the reaction step.

5. A process according to claim 4 wherein the concentrated liquid is neutralized with sulfuric acid, ammonia and carbon dioxide are separated from the neutralized concentrated liquid and the thus-separated gases are also recycled to the reaction step.

References Cited

UNITED STATES PATENTS

| | | | |
|---|---|---|---|
| 2,717,253 | 9/1955 | Holland | 260—534 S |
| 2,557,913 | 6/1951 | Livak | 260—534 S |
| 2,480,644 | 8/1949 | Goldsmith, et al. | 260—534 |
| 2,692,959 | 6/1953 | White | 260—534 |
| 2,663,713 | 12/1953 | White, et al. | 260—309.5 |

FOREIGN PATENTS

| | | | |
|---|---|---|---|
| 133,717 | 10/1946 | Australia | 260—534 S |

LORRAINE A. WEINBERGER, Primary Examiner

J. L. DAVISON, Assistant Examiner

U.S. Cl. X.R.

260—309.5, 347.3, 482 R, 482 P, 518 R, 534 R, 534 C, 534 G